(12) United States Patent
Huber et al.

(10) Patent No.: US 8,406,968 B2
(45) Date of Patent: Mar. 26, 2013

(54) CONTROL SYSTEM FOR A VEHICLE HAVING A TRANSMISSION WITH AUTOSHIFT FUNCTION

(75) Inventors: Karl Huber, Ottensheim (AT); Burkhard Reichl, Bad Hall (AT); Maximilian Ostheimer, Nesselwang (DE)

(73) Assignee: CNH America LLC, New Holland, PA (US)

( * ) Notice: Subject to any disclaimer, the term of this patent is extended or adjusted under 35 U.S.C. 154(b) by 339 days.

(21) Appl. No.: 12/939,122

(22) Filed: Nov. 3, 2010

(65) Prior Publication Data
US 2011/0106386 A1 May 5, 2011

(30) Foreign Application Priority Data
Nov. 4, 2009 (IT) .................................. TO20090848

(51) Int. Cl.
*F16H 61/70* (2006.01)
*B60K 31/04* (2006.01)
*G06F 19/00* (2006.01)

(52) U.S. Cl. ................. 701/52; 701/54; 477/97

(58) Field of Classification Search ............. 701/52, 701/54, 56, 61, 64, 51; 477/97, 79
See application file for complete search history.

(56) References Cited

U.S. PATENT DOCUMENTS

| 4,631,679 | A | * | 12/1986 | Klatt ............................... 701/52 |
| 5,083,479 | A | * | 1/1992 | Ito et al. ......................... 477/97 |
| 5,441,463 | A | * | 8/1995 | Steeby ............................. 477/79 |
| 5,974,354 | A | * | 10/1999 | Janecke et al. ................. 701/64 |
| 5,991,678 | A | * | 11/1999 | Gil .................................. 701/51 |
| 2008/0140302 | A1 | | 6/2008 | Bulgrien |
| 2009/0012682 | A1 | | 1/2009 | Mathis |

FOREIGN PATENT DOCUMENTS

| DE | 3337930 | 7/1987 |
| GB | 2446958 | 8/2008 |
| WO | WO2008/150201 | 12/2008 |

* cited by examiner

*Primary Examiner* — Tan Q Nguyen
(74) *Attorney, Agent, or Firm* — Patrick Sheldrake; Sue C. Watson

(57) ABSTRACT

A control system and method for a vehicle having an engine and a transmission with an autoshift function comprises a processor coupled to the engine and the transmission of the vehicle and adapted to control the power output of said engine and, in an autoshift mode of operation, the upshifting and downshifting of the transmission. The control system further comprises user interface means (10) coupled to said processor and including a first manual control means (14) being operable to be set to a first engine speed, and a second manual control means (16) being operable to be set to a second engine speed. The interface means (10) provides signals representing the setting of said first and second manual control means (14, 16) to said processor; and said control system has a plurality of modes of operation selectable by the relative settings of said first and second manual control means.

15 Claims, 5 Drawing Sheets

CONTROL SYSTEM FOR A VEHICLE HAVING A TRANSMISSION WITH AUTOSHIFT FUNCTION

This Patent Application claims priority under 35 U.S.C. §119 to Italian Application TO20090848, filed on Nov. 4, 2009 titled, "Control System for a Vehicle having a Transmission with Autoshift Function" and having Karl Huber, Maximilian Ostheimer, Burkhard Reichl as inventors. The full disclosure of TO20090848 is hereby fully incorporated herein by reference.

The present invention relates to vehicle control systems and more specifically to a control system for a vehicle having a transmission with autoshift functions.

In vehicle control systems having a transmission with autoshift functions, the control system includes software implemented shifting logic which mainly is based on torque and engine speed to determine at what conditions an upshift or downshift of the transmission should occur on driving the vehicle.

The conditions and parameters determining whether an upshift or downshift should be initiated by the control system are normally either set in the factory or may be changed by the user by re-programming the shifting control logic which mostly is a time consuming operation and cannot be done on the fly.

Further, once the set up of the shifting points has been done, it is not readily recognizable what setting is in effect. It is therefore not easy for the driver to figure out the circumstances when the gears are changed down or up. No visible feedback of settings is provided to the operator when entering the tractor.

The object of the present invention is to overcome the above disadvantages of the prior art by providing a control system and a method giving the driver easy and ready control over the autoshift function.

According to a second aspect of the present invention, a method for operating a vehicle control system is provided as defined in claim 9.

With the control system and method according the present invention, two manual control means or two hand throttles are provided, the setting thereof giving a clear indication to the driver what the transmission will do in the autoshift mode. By adjusting the setting and relative position of the manual control means, the operator may select one of a plurality of modes of operation in a simple and intuitive manner.

In accordance with one embodiment of the invention, by setting said first manual control means to a first engine speed and by setting said second manual control means to a second engine speed higher than said first engine speed, the operator may select a first mode of operation, wherein a processor of the control system is caused to issue an upshift command to said transmission when the engine speed increases beyond said second engine speed setting and to issue a downshift command to said transmission when the engine speed decreases below said first engine speed setting.

If the processor is provided with input means for a desired vehicle speed, the processor may be adapted to continue with issuing upshift commands after the vehicle has reached said desired vehicle speed until the engine speed decreases to a value near but above the first engine speed.

In accordance with a further embodiment of the invention, by setting said first manual control means and said second manual control means to substantially the same engine speed, the operator may select a second mode of operation, wherein the processor is caused to issue power commands to said engine tending to maintain an existing gear setting, and to issue an upshift command to said transmission only when the engine speed increases beyond an upper engine speed threshold and to issue a downshift command to said transmission only when the engine speed decreases below a lower engine speed threshold.

In accordance with a further embodiment of the invention, by setting said first manual control means to a first engine speed and by setting said second manual control means to a second engine speed lower than said first engine speed, the operator may select a third mode of operation, wherein the processor is caused to issue power commands to said engine tending to maintain said first engine speed, and to issue a downshift command to said transmission only when the engine speed decreases below said second engine speed setting.

The invention will now be described in further detail, by way of example, with reference to the accompanying drawings in which.

Specific embodiments will now be described for the purpose of illustration only. In the drawings, like reference numerals refer to like parts throughout the several views.

Figure 7:
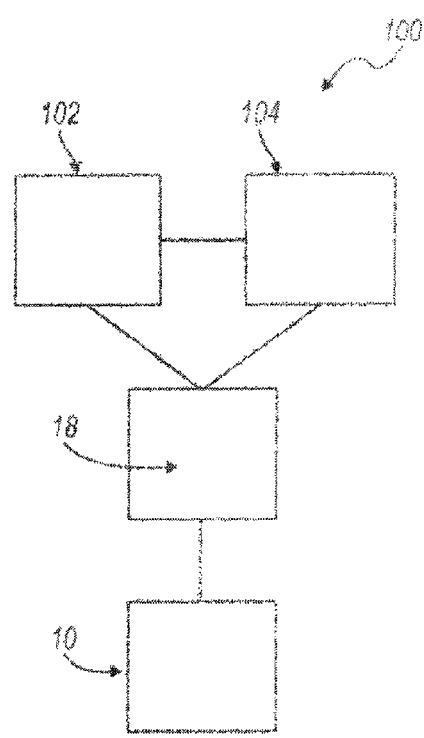
FIG. 7 is a schematic representation of the vehicle control system of the invention.

To provide a general overview over a control system and method according to the present invention, attention is drawn to FIG. 7, wherein a general version of a vehicle control system 100 is shown. The vehicle (not shown) comprises an engine 102, preferably an internal combustion engine, which provides its output in the form of rotational motion at a given angular velocity to a transmission 104 which is provided with an autoshift function of a construction known in the art. Both the engine 102 and the transmission 104 provide signals representing operational conditions thereof to a processor 18 of the control system 100. The processor 18 in turn provides control signals to the engine 102 and the transmission 104.

The processor 18 functions to select a desired engine speed from a range of engine speeds based on the required power output of the vehicle system. The control system 100 is designated for controlling engine speed of a vehicle system having an engine and a required power output, but may be used in any suitable environment.

The control system 100 further comprises a user interface 10 coupled to the processor 18 and operative to provide control signals thereto as set out below in detail.

Figure 1:
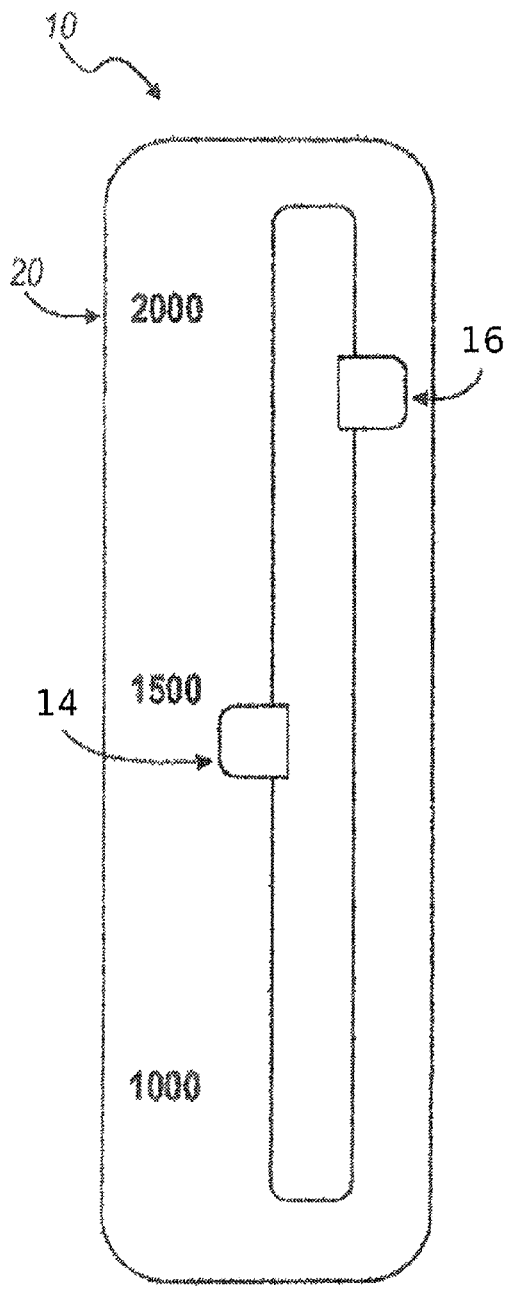
FIGS. 1, 2 and 3 are schematic drawings of the manual control means of a control system of a first embodiment of the invention.
Figure 2:
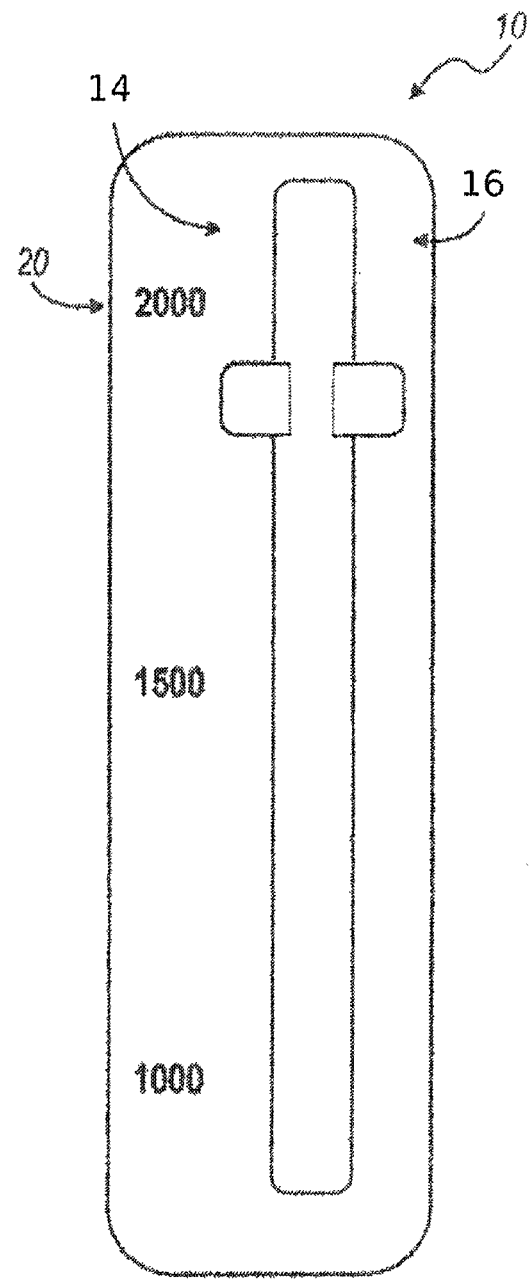
Figure 3:
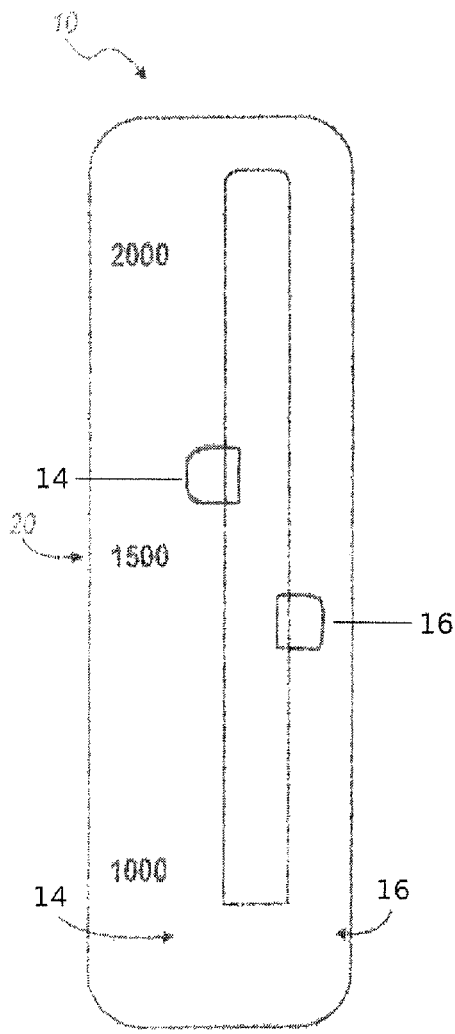

FIGS. 1 to 3 show an embodiment of the user interface 10. This user interface 10 comprises a first control 14 for manually setting a first engine speed and a second control 16 for manually setting a second engine speed.

The controls 14, 16 may include a grip portion including geometry such as indents for fingers and a second material such as rubber to facilitate gripping or moving by hand or with fingers.

Figure 4:
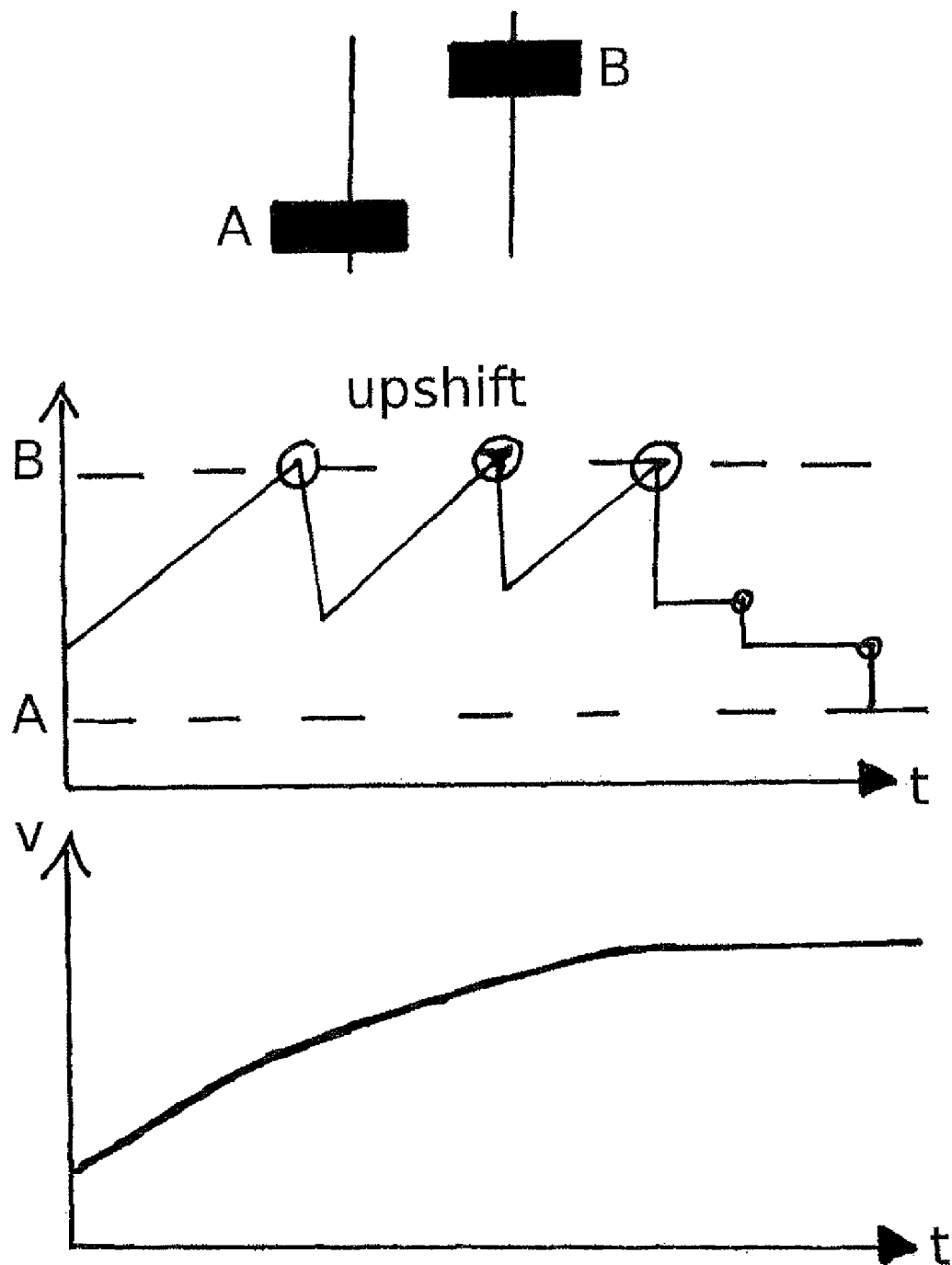
FIG. 4 is a schematic representation of the setting of the first and second manual control means in a first mode of operation of the invention.
Figure 5:
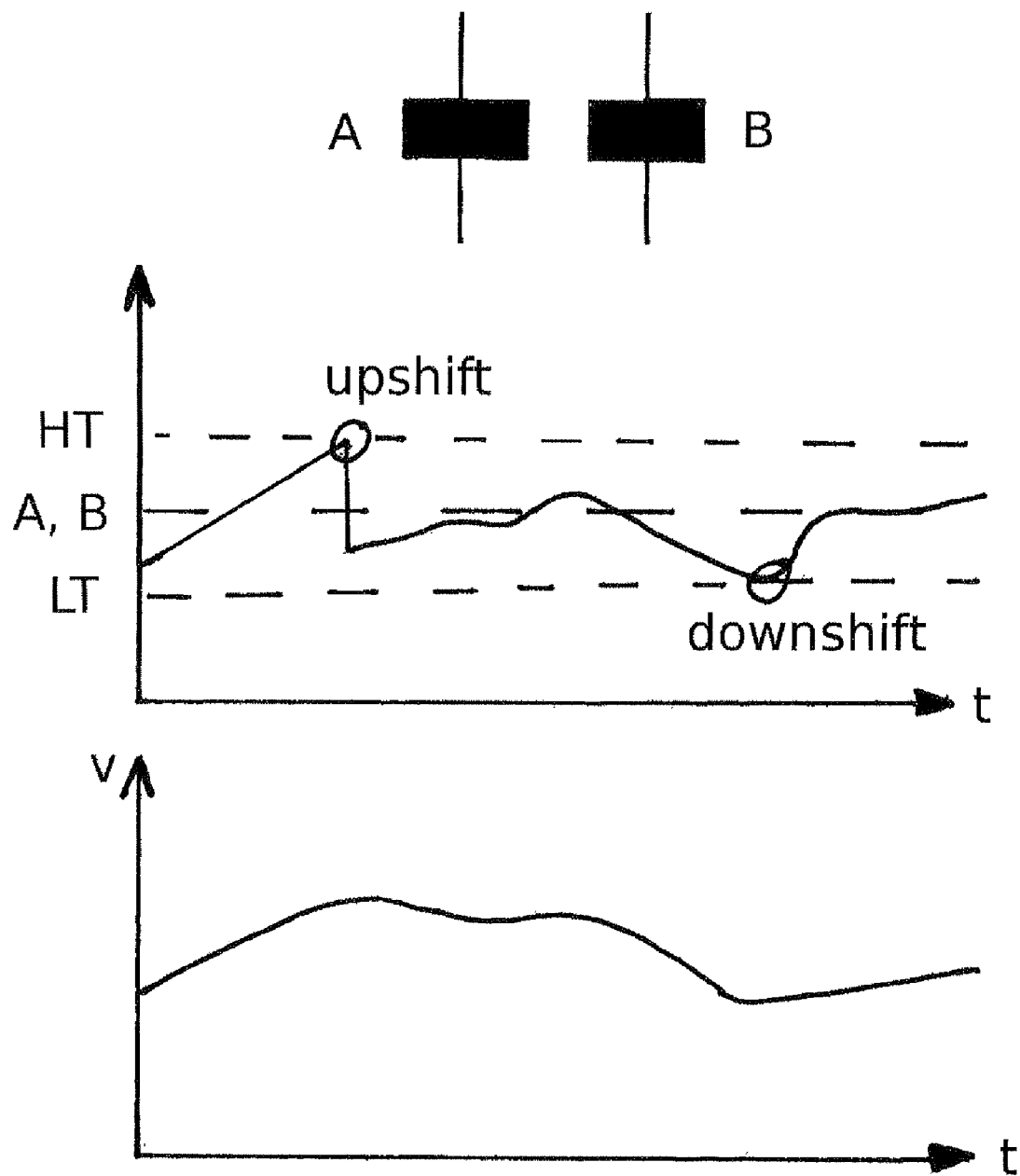
FIG. 5 is a schematic representation of the setting of the first and second manual control means in a second mode of operation of the invention.
Figure 6:
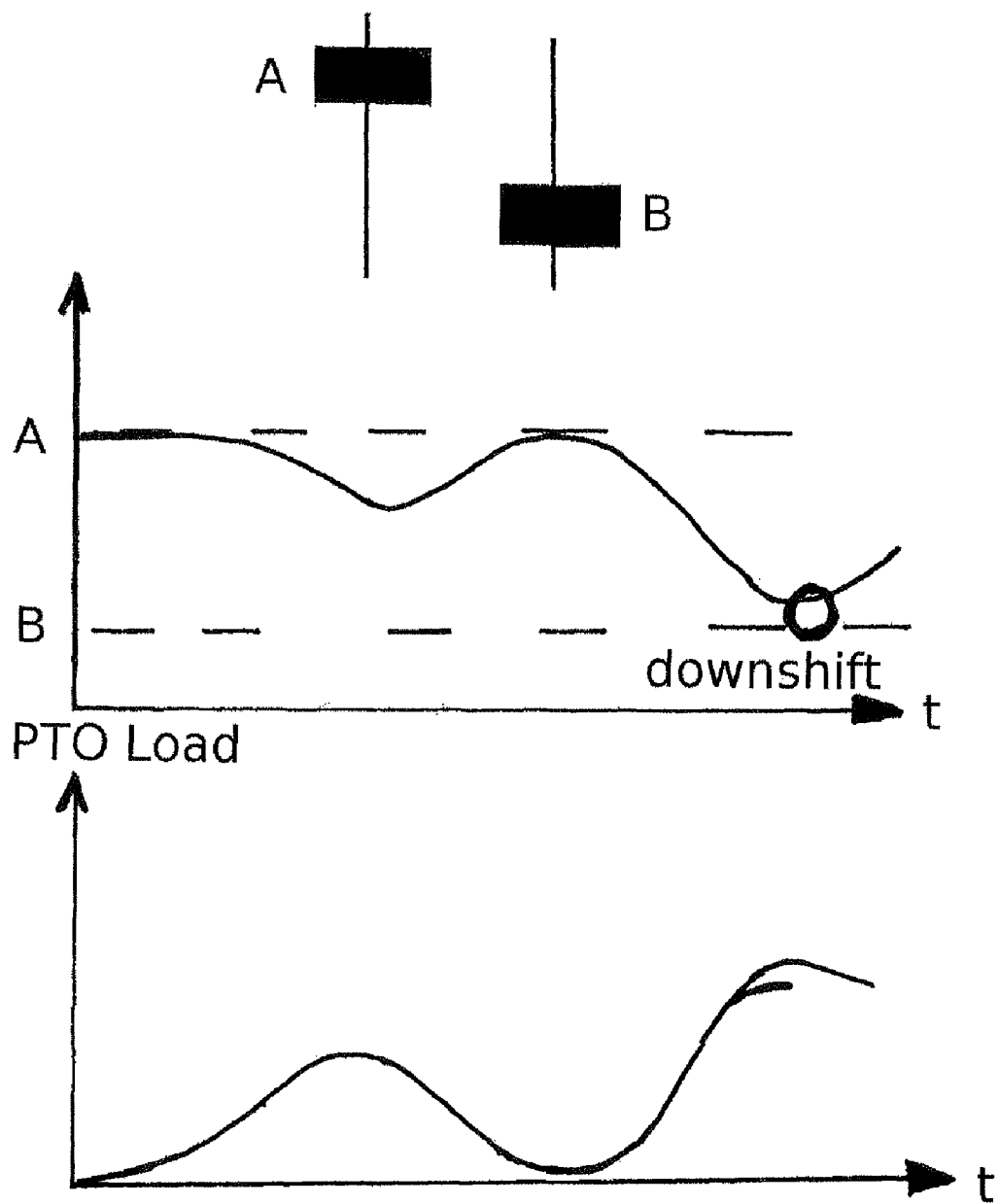
FIG. 6 is a schematic representation of the setting of the first and second manual control means in a third mode of operation of the invention.

In the embodiment shown in FIGS. 1, 2 and 3, the first control 14 and the second control 16 are sliding controls that can be slid along a linear path in a track, groove, or in any other suitable device or manner. An operator may slide the first sliding control 14 to a point on a graduation 20 such that the first sliding control designates a first engine speed A (FIGS. 4 to 6). Similarly, the operator may slide the second sliding control 16 to a point on the graduation such that the second sliding control 16 designates second engine speed B. The first control 14 and the second control 16 may be located in the same track or groove, in separate tracks or grooves located near one another, in separate tracks or grooves located in different regions of the user interface, or in any other suitable configuration in any suitable region of the user interface.

Further, in other embodiments, the first and second controls 14, 16 may be levers that can be pivoted about an axis. The first control 14 and the second control 16 may be located on the same pivot point, located near one another in the same region of the user interface, located in different regions of the user interface, or in any other suitable configuration in any suitable region of the user interface.

A further embodiment of the controls 14, 16 may comprise dials that can be rotated about an axis. In this variation, the first control 14 and the second control 16 may include an arrow, a dot, a line, or any other suitable indicator on the dial, adjacent to the dial, or in both locations such that the operator may rotate the first control 14 and the second control 16 to a specific point to designate the first and second engine speeds, respectively. The dials of the first control 14 and the second control 16 may be located near one another in the same region of the user interface, located in different regions of the user interface, or in any other suitable configuration in any suitable region of the user interface. Additionally, the first and second dials may be concentrically located and rotate about the same axis. The first control 14 and the second control 16 are preferably standard dials and may be circular, polygonal (hexagonal, octagonal, etc.), rectangular or any other suitable geometry such that the operator may turn or rotate them.

It will be obvious to a person skilled in the art that the first control 14 and the second control 16 may be any other suitable device such that the first control 14 designates a first engine speed and the second control 16 designates a second engine speed.

The selection of engine speeds allows the operator to base the speed of the engine on more than one parameter or function of the engine, such as power output, fuel efficiency, and noise signature.

Depending on the setting of the controls 14, 16, the control system 100 may assume one of a plurality of modes of operation.

In a first mode of operation schematically shown in FIG. 4, the operator may set, as a first engine speed A, a low engine speed with control 14 and as a second speed B, a high engine speed with control 16, as indicated in the upper part of FIG. 4. When engaging the automatic mode, the transmission will upshift when the engine reaches high engine speed setting B and will downshift when reaching the low engine speed setting A on the two controls or hand throttles.

An economically oriented operator would upshift at quite low engine speed (about. 1700 to 1800 rpm of the engine) to save fuel he would use the highest possible gear. The downshift would occur when the engine can not capture the load anymore (about 1300 rpm of the engine). By setting the controls 14, 16 accordingly, the operator not only gains full control over the behaviour of the control system, but also may see at a glance at which engine speeds an upshift or downshift will occur.

These settings do not influence the other behaviour of the machine, that means, the standard hand throttle-function is still on the movable control-lever as conventional.

In the lower part of FIG. 4, the development of the vehicle speed v over time t corresponding to the shifting actions in the upper part of FIG. 4 is shown. It further is shown that after the third upshift action, the vehicle has reached a desired vehicle speed input into the processor 18. Under these conditions, and when the load further decreases, the processor 18 is adapted to continue with issuing upshift commands until the engine speed is closest possible to engine speed setting A (fourth and fifths upshift actions in the upper part of FIG. 4).

In FIG. 5, a second mode of operation is shown wherein controls 14, 16 are set to the same engine speed, so that the control system 100 tries to keep the transmission in the same gear until reaching a lower threshold LT when the load increases, resulting in a downshift. In a similar manner, an upshift will occur when the load decreases and the engine speed reaches an upper threshold HT. For part load, the transmission will stay in gear since no threshold will be reached, as shown in the upper part of FIG. 5.

In the lower part of FIG. 5, again the the development of the vehicle speed v over time t corresponding to the shifting actions in the upper part of FIG. 5 is shown In a third mode of operation exemplified in FIG. 6, the first control 14 is set to a higher engine speed A than the second engine speed B set by the second control 16, as shown in the upper part of FIG. 6.

This may be useful, for instance if it is desired to use the transmission to drive a PTO which should be kept at a more or less fixed rotational speed. In this case, the first control 14 would set to an engine rotational speed A resulting in the desired PTO speed. Further, in this case, the second control 16 would be set to a rotational speed lower than set by the first control 15 so that the transmission will shift down if the PTO load indicated in the lower part of FIG. 6 increases and the engine speed decreases below a rotational speed set by the second control 16. On the other hand, the transmission would shift up if the engine goes above the rotational speed set by the first control 14.

What is claimed is:

1. A control system for a vehicle having an engine and a transmission with an autoshift function, said control system comprising:
    a processor coupled to the engine and the transmission of the vehicle and adapted to control the power output of said engine and, in an autoshift mode of operation, the upshifting and downshifting of the transmission based on parameters including the engine torque and speed; and
    an input coupled to said processor and adapted to receive, further parameters selected by the user for varying the shifting points for upshifting and downshifting;
    said control system further comprises a user interface coupled to said processor and including a first manual control being operable to be set to a first engine speed, and a second manual control being operable to be set to a second engine speed, said interface being adapted to provide signals representing the setting of said first and second manual control to said processor;
    said control system has a plurality of modes of operation selectable by the relative settings of said first and second manual control.

2. The control system according to claim 1, wherein by setting said first manual control to a first engine speed and by setting said second manual control to a second engine speed higher than said first engine speed, a first mode of operation is selectable, wherein said processor is operable to issue an upshift command to said transmission when the engine speed increases beyond said second engine speed setting and to issue a downshift command to said transmission when the engine speed decreases below said first engine speed setting.

3. The control system according to claim 2, wherein said processor is provided with input for a desired vehicle speed and is adapted to continue with issuing upshift commands after the vehicle has reached said desired vehicle speed until the engine speed decreases to a value near but above the first engine speed.

4. The control system according to claim 1, wherein by setting said first manual control and said second manual control to substantially the same engine speed, a second mode of operation is selectable, wherein said processor is operable to issue power commands to said engine tending to maintain an existing gear setting, and to issue an upshift command to said transmission only when the engine speed increases beyond an upper engine speed threshold and to issue a downshift command to said transmission only when the engine speed decreases below a lower engine speed threshold.

5. The control system according to claim 1, wherein by setting said first manual control to a first engine speed and by setting said second manual control to a second engine speed lower than said first engine speed, a third mode of operation is selectable, wherein said processor is configured to issue power commands to said engine to maintain said first engine speed, and to issue a downshift command to said transmission only when the engine speed decreases below said second engine speed setting.

6. The control system according to claim 1, wherein said first and second manual control includes a first and a second lever or sliding control, respectively.

7. The control system according to claim 6, wherein said first manual control is collocated with said second manual control.

8. The control system according to claim 1 wherein said first and second manual controls includes a first and a second dial, respectively.

9. The control system according to claim 8, characterized in that said first and second dials are concentrically located.

10. A method for controlling a vehicle having an engine a transmission with an autoshift function; comprising the steps of providing a control system comprising a processor coupled to the engine and the transmission of the vehicle and adapted to control the power output of said engine and, in an autoshift mode of operation, the upshifting and downshifting of the transmission based on parameters including the engine torque and speed; and input coupled to said processor and adapted to receive, as an input, further parameters selected by the user for varying the shifting points for upshifting and downshifting;
providing user interface coupled to said processor and including a first manual control being operable to be set to a first engine speed, and a second manual control operable to be set to a second engine speed, said interface adapted to provide signals representing the setting of said first and second manual controls to said processor;
providing said control system with a plurality of modes of operation selectable by the relative settings of said first and second manual controls.

11. The method according to claim 10, wherein by setting said first manual control to a first engine speed and by setting said second manual control to a second engine speed higher than said first engine speed, a first mode of operation is selected, wherein said processor is caused to issue an upshift command to said transmission when the engine speed increases beyond said second engine speed setting and to issue a downshift command to said transmission when the engine speed decreases below said first engine speed setting.

12. The method according to claim 11, wherein said processor is provided with input for a desired vehicle speed, wherein said processor is adapted to continue with issuing upshift commands after the vehicle has reached said desired vehicle speed until the engine speed decreases to a value near but above the first engine speed.

13. The method according to claim 10, wherein by setting said first manual control and said, second manual control to substantially the same engine speed a second mode of operation is selected, wherein said processor is caused to issue power commands to said engine tending to maintain an existing gear setting, and to issue an upshift command to said transmission only when the engine speed increases beyond an upper engine speed threshold and to issue a downshift command to said transmission only when the engine speed decreases below a lower engine speed threshold.

14. The method according to claim 10, characterized in that by setting said first manual control to a first engine speed and by setting said second manual control to a second engine speed lower than said first engine speed, a third mode of operation is selected, wherein said processor is caused to issue power commands to said engine tending to maintain said first engine speed, and to issue a downshift command to said transmission only when the engine speed decreases below said second engine speed setting.

15. A control system for a vehicle having an engine and a transmission, said control system comprising:
a processor coupled to the engine and the transmission of the vehicle and configured to control the power output of said engine and, in an autoshift mode of operation, the upshifting and downshifting of the transmission based on parameters including the engine torque and speed;
said control system further comprises a user interface coupled to said processor and including a first manual control for setting a first engine speed, and a second manual control for setting a second engine speed, said interface configured to provide signals representing the setting of said first and second manual control to said processor;
said control system has a plurality of modes of operation selectable by the relative settings of said first and second manual control; and
wherein by setting said first manual control to a first engine speed and by setting said second manual control to a second engine speed lower than said first engine speed, a mode of operation is selectable, wherein said processor is configured to issue power commands to said engine to maintain said first engine speed, and to issue a downshift command to said transmission only when the engine speed decreases below said second engine speed setting.

* * * * *